April 8, 1941.　　　W. F. ZIMMERMANN　　　2,237,466
SUPPORT FOR ADJUSTABLE CHANGE GEAR STUDS
Filed June 1, 1939　　　2 Sheets-Sheet 1
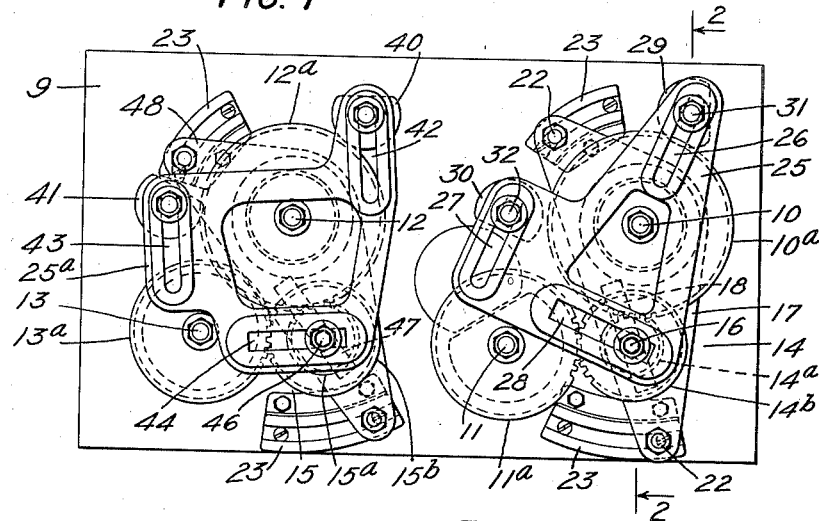
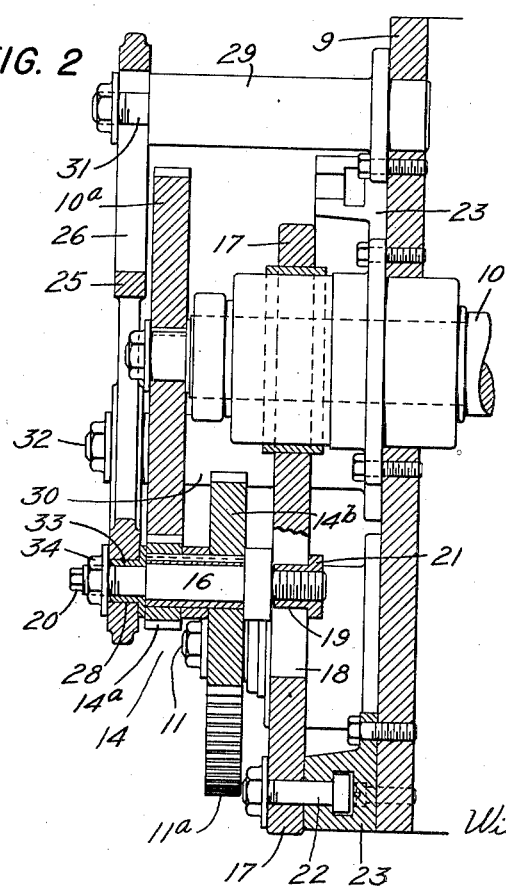
INVENTOR
William F. Zimmermann
BY
Albert F. Nathan
ATTORNEY April 8, 1941.  W. F. ZIMMERMANN  2,237,466
SUPPORT FOR ADJUSTABLE CHANGE GEAR STUDS
Filed June 1, 1939  2 Sheets-Sheet 2

INVENTOR
William F. Zimmermann
BY
Albert F. Nathan
ATTORNEY

Patented Apr. 8, 1941

2,237,466

UNITED STATES PATENT OFFICE 2,237,466

SUPPORT FOR ADJUSTABLE CHANGE GEAR STUDS

William F. Zimmermann, Maplewood, N. J., assignor to Gould & Eberhardt, Newark, N. J., a corporation of New Jersey Application June 1, 1939, Serial No. 276,758

12 Claims. (Cl. 74—325)

The present invention relates to change gear mechanisms and is concerned more particularly with a support for the outer end of a universally adjustable change gear stud.

A primary aim of the invention is to increase the life of various bushings and studs used in the drive, to insure proper tooth relation and contact and to distribute the reacting forces of the drive uniformly over the entire axial length of the gear, bushing and stud, instead of the heretofore unbalanced concentration of those forces at one end thereof.

A further aim of the invention is to prevent unbalanced or one sided wear upon the teeth of the gears of a speed change transmission, and to eliminate the inaccuracies and noise incident thereto, by rendering available a rigid support for the outer end of adjustable stud shafts.

Still a further aim of the invention is to provide a detachable support, devoid of complexities in manufacture and in use, for the outer end of a stud shaft, for maintaining axial parallelism of the shaft, that is universally adjustable in character and capable of affording the necessary support to the stud, irrespective of the position to which the stud has been shifted in effecting a given speed ratio. In some change speed transmissions the stud shaft is arranged for a single shifting movement, whereas, in other transmissions the stud shaft is arranged for adjustment in transverse directions, e. g., radially and angularly. In the latter type, the axis of the stud may be positioned anywhere within the area or field plotted from combinations of the two extremes of transverse movements. The present invention undertakes to provide a universally adjustable support for a stud shaft that will effectively brace and maintain the shaft in proper alignment, irrespective of the location of the shaft within its field of movement.

In carrying forward the invention it is proposed to mount a supporting brace to the outer wall of the gear case in spaced relation therewith so as to lie outside of the pick-off change gear mechanisms. The brace is preferably somewhat triangular in shape having three connected arms, two of which afford anchoring arms for the third which is adapted to support the outer end of the adjustable stud shaft.

In order properly to locate the brace so as to give the necessary support to the end of a universally adjustable stud, the brace is provided with three transversely arranged elongated slots, two of which are for the anchor bolts, and the third for the end of the change gear stud shaft. And by forming two of the slots parallel and spaced from each other, and the third substantially at right angles thereto, it is possible to locate the brace on the two anchor studs in a position wherein the third slot will be properly related as to receive and have clamped thereto the change gear stud, regardless of its position in the field delineated by various combinations of its transverse movements.

By way of illustration, if it be assumed that the change gear stud is radially adjustable on an angularly adjustable arm, the axis of the stud may be caused to inscribe a four sided geometrical figure which defines the maximum area of universal movement. The support for the outer end of the stud must also be capable of movement to inscribe a similar area of at least equal size. If the two parallel slots of the plate be the anchor bolt slots, and the third and transverse slot be the stud receiving slot, one may shift the plate in the direction of the longitudinal axis of the anchoring slots and quickly bring some portion of the transverse slot in coincidence with the change gear stud, wherever the latter may be positioned in its field.

In this way there is provided a simple means, attachable to any gear box, for supporting the outer end of a stud shaft of a change gear transmission to maintain true parallelism of the axes of the several shafts and all of the advantages evolving therefrom.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 is a side elevation of the invention in connection with a typical change gear mechanism involving pick-off gears and shiftable gear studs.

Fig. 2 is a side view thereof partly in section.

Figure 4:
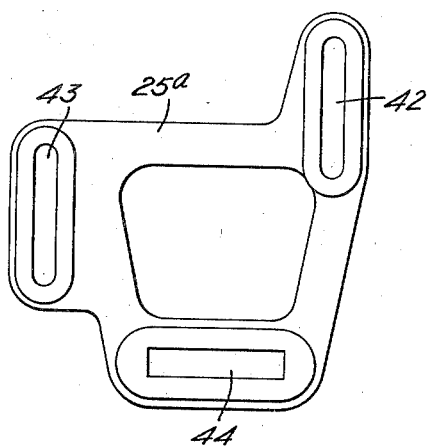
Figs. 3 and 4 are plan views of two forms of outer braces, removed from the gear box.

Referring to Figs. 1 and 2 of the drawings, the invention is illustrated in connection with a large size gear hobbing machine in which the numeral 9 represents the main gear box of the machine. Inside the gear box are journaled the major portions and elements of the transmission, but as that mechanism per se is not part of the present invention, it is thought unnecessary to illustrate it. Suffice it to say, that driving and driven shafts 10 and 11, 12 and 13 project through the side of the box and have mounted thereon pick-off gears 10a, 11a, 12a and 13a respectively. The drive is established through these sets of gears by means of compound idler gears 14 and 15, each of which comprises two gears 14a and 14b, and 15a and 15b.

With reference more particularly to the speed change transmission illustrated at the right of Fig. 1, the compound gear 14 is journaled on a shiftable stud shaft 16. The shaft 16 in turn is supported by an angularly adjustable change gear arm 17 which pivots about the axis of the shaft 10.

A radially extending slot 18 is formed in the arm and finished to receive a flattened nut 19 into which the inner end of the stud shaft is screw threaded. Thus, by turning the outer polygonal end 20 of the stud, the flange 21 at the inner end is caused to be clamped firmly to the arm in a preselected radial position. The arm itself is provided at either end thereof with T-bolts 22, which in cooperation with the arcuate slotted pads 23, serve as a convenient means for clamping the arm in a pre-selected angularly adjusted position.

The stud shaft 16, therefor, is capable of being adjusted radially and angularly relative to the shaft 10 thereby to position the pitch lines of the gears 14a and 14b in proper relation with the pitch lines of their respective meshing gears 10a and 11a. When so related the stud shaft is clamped to the arm and the arm clamped to the gear box. If a different speed ratio is required between the shafts 10 and 11, one or more of the gears 10a, 11a, 14a, 14b, are removed and replaced by others of different ratio and the stud shaft and arm readjusted and reclamped as before.

The stud shaft 16 has in this arrangement a compound movement and may assume innumerable positions depending upon the extent and number of speed changes required in a given machine. However, within the speed change requirements of any given change gear mechanism, the radial and angular movements of the stud shaft will be limited and the field covered by the shiftable stud shaft will be the area defined by a line connecting the four extremes. In the disclosure herein made, the field of available movement of the stud 16, with due regard being given to the sizes of a serviceable and practical range of gear ratios, is indicated by the sectional area 24 in Fig. 5.

Prior to this invention it was customary to rely solely upon the connection of the stud to the change gear arm, and the tightness of the arm clamp, to hold the stud shaft in position. When however, the reacting forces of the drive were great or there is substantial overhang of the shaft from its inner support, the single inner support cannot be relied upon to perform the intended office, without using impractical and prohibitive sizes and proportions.

By the present invention, a solution to this problem is proposed which consists in fixedly mounting an adjustable brace 25 outside of the pick-off gearing, in a position suitable for the clamping of the outer end of the stud shaft thereto. Thus to provide mutually supporting inner and outer end supports for the intervening adjustable stud shafting and gearing.

The outer support may assume varied forms according to conditions, and comprises, in its essential, a flat plate member 25, generally triangular in shape, having three elongated slots 26, 27 and 28 formed therein. Two of the slots 26 and 27 have their longitudinal axes parallel, but are spaced from each other laterally and longitudinally for the purpose of insuring rigid bracing action when the support is clamped in position upon the ends of fixed studs 29 and 30.

The fixed studs 29 and 30 are bolted to the side of the gear box in positions clearing the swing of the change gear arm and largest pick-off gear that will be employed in the drive, and are provided with reduced ends 31 and 32 that pass through the parallel slots 26 and 27 in the plate member 25.

The third slot 28 in the plate extends in a direction transverse the parallel anchoring slots 26 and 27, and is finished to receive the bushed end of the adjustable gear stud 16. As illustrated in Fig. 2, the outer end of the gear stud shaft 16, is reduced to provide a shoulder against which a flanged bushing 33 seats. Beyond the bushing 33, the shaft is threaded to receive a flanged nut 34, by means of which the shaft may be clamped firmly to the outer brace after it has been clamped to the inner change gear arm 17.

Figure 3:
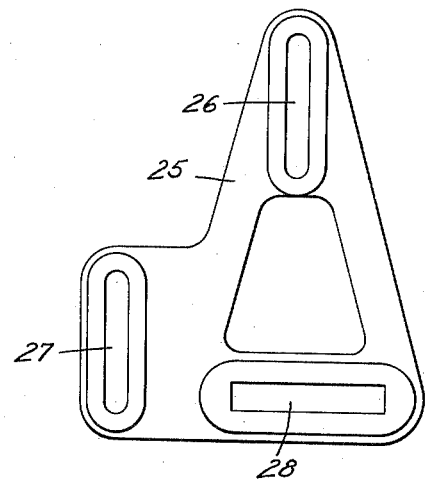
Figure 5:
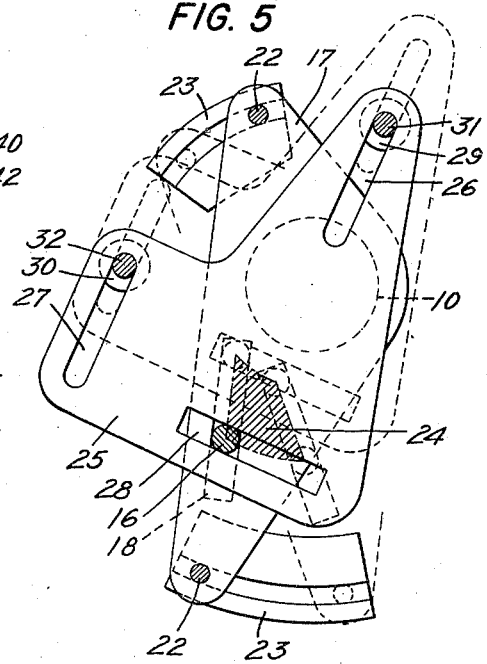

Figs. 1, 3 and 5 of the drawings illustrate the relative positions of the slots in the brace 25 to each other and to the adjustable axis of the compound gear stud. And it will be observed that the two anchoring slots 26 and 27 afford a substantial movement of the brace 25 longitudinally thereof, whereas, the transverse slot 28 permits of substantial movement of the stud shaft 16 in the transverse direction. With the parts related and proportioned as indicated, the area delineated by moving the plate through its extremes, and the change gear stud in the stud slot 28, through its extremes, will be many times the area covered by the movement of the stud shaft in the change gear arm.

Figure 6:
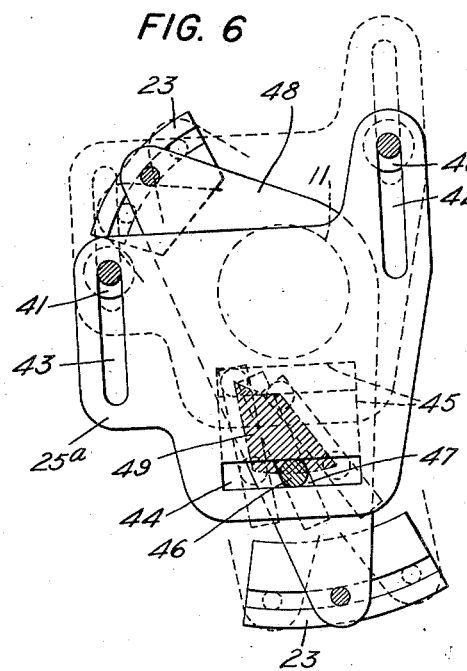
Figs. 5 and 6 are diagrammatic views of superposed change gear arms and braces illustrating the relationship of the fields of movement of the studs to the fields of movement of the outer supporting braces.

Figs. 1, 4 and 6, illustrate the principle of the invention applied to a modified form of brace, and illustrates the adaptability of the invention to a different arrangement of change gear mechanism. In these figures also, the outer support 25a is generally triangular and has two of its connected arms normally secured in a predetermined adjusted position to the outer ends of the fixed studs 40 and 41.

A set of spaced parallel anchor slots 42 and 43 and a transverse stud slot 44 are provided in the plate adjacent the respective corners of the triangle and afford a substantial range of plate shifting movement and a substantial range of stud shifting movement transversely thereto. The combination of movements, enscribing a large rectangular field 45 of available stud movement.

The compound gear stud 46 has its inner end slidably mounted in a slot 47 formed in an angularly adjustable change gear arm 48. The combination of movements for the stud thereby afforded, enscribes a smaller field 49 (illustrated in section-lining in Fig. 6) that lies completely within the borders of the field 45.

In the laying out of an outer support for an adjustable stud shaft, the field of movement of the stud is first plotted. Then the two fixed anchor studs are located, approximately equally spaced from the field of stud movement and from each other, so as to form the two base points of a triangle. The third point or apex of the triangle will be the stud axis. The slots paralleling each other are laid out through the anchor points, and a third slot, transversely related, is laid out through the stud point.

The direction of extent of the anchor slots will depend upon the direction available for movement of the outer support. For example, if structural considerations require a vertically movable outer support, the anchor slots will extend vertically and the stud slot horizontally. On the other hand, if the outer support in a given construction can be moved only laterally, the anchor slots extend in that direction and the stud slot transversely thereto. In either event, the spaced anchorage points affords a sturdily braced mounting for the third point of the triangle (stud) and effectively supports the stud against movement in any of its adjusted positions.

An outer support so designed lends itself adaptable to mounting upon a gear box in the most suitable position with its field of adjustment fully superposed and overlapping the field of movement of the compound stud, and by spacing the anchor bolt slots and the gear stud slot from each other, as the points of a triangle, a strong and rigid bracing of the outer end of the shiftable stud may be attained in all adjusted positions of the latter.

By this invention there is afforded a simple means for giving the much needed bracing to the outer end of a stud shaft whereby true parallelism of shafts and proper tooth engagement may be maintained at all times. The brace is moreover quickly and completely removable thereby to render free and unobstructed access to the several pick-off gears of the transmission.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A removable support for a radially and angularly adjustable change gear stud of a pick-off gear speed change transmission, comprising a plate member having formed therein at least three elongated openings spaced from each other as the points of a triangle with one of said elongated openings extending in a direction transverse the direction of extent of the other of said openings; means cooperating with two of said openings for anchoring said plate in parallel spaced relation to the housing of the transmission and in a position wherein a portion of the length of the third of the said elongated openings in the plate coincides with the axis of the adjustable change gear stud in any radially or angularly adjusted position thereof; and means coacting with said third opening for clamping the stud to the plate.

2. A change speed transmission including a transmission housing, a driving shaft, a driven shaft and an intermediate radially and angularly adjustable stud shaft, each of said shafts being adapted to support a gear in meshing relation with one another, the combination of an adjustable support for the outer end of said adjustable stud shaft comprising a plate member having formed therein a plurality of slots spaced from each other with the axis of at least two of said slots arranged transversely to each other; spaced stud means fixed to said housing and cooperating with two of the spaced slots in the plate for anchoring said plate to the housing in a predetermined adjusted position thereby to place an operative portion of another of said slots in coincidence with the axis of the adjustable stud in any radially or angularly adjusted position thereof; and means for clamping the outer end of the adjustable stud to the said plate.

3. An outer support for the end of a compoundly adjustable change gear stud of a change speed transmission comprising a shiftable plate member having formed therein at least three elongated slots spaced from each other and located near the margins of said plate two of said slots being positioned in offset parallel relation and the third slot arranged transversely thereto; means cooperating with two of said spaced slots for anchoring said plate in a predetermined adjusted position to the transmission housing with an operative portion of the third of said slots in coincidence with the axis of the compoundly adjustable change gear stud in any adjusted position of the latter; and means for clamping the outer end of the stud to the plate.

4. A support for the outer end of an adjustable change gear stud comprising a generally triangular plate member having formed therein at least three elongated slots spaced from each other and located near the points of the triangle; one of said slots extending lengthwise of the base of the triangle and the other two of said slots extending parallel to a perpendicular from the base; normally fixed means cooperating with two of said slots for anchoring said plate fixedly in position with an operative portion of the third of said slots in coincidence with the axis of the adjustable change gear stud; and means including the said third slot for clamping the outer end of the change gear stud to the plate.

5. In combination with a pick-off change gear transmission having a gear box and at least one external driving gear and one external driven gear and an external angularly and radially adjustable idler gear; an adjustable supporting shaft for said intermediate adjustable gear; an angularly adjustable support for the inner end of said shaft; an adjustable support for the outer end of said shaft comprising a plate member having a pair of parallel arranged elongated slots formed therein, said plate also having a third elongated slot formed therein whose longitudinal axis extends in a direction transverse the axes of the said two parallel slots; anchoring means supported by the gear box and cooperatively related with two of the said slots in the plate for supporting the plate rigidly in spaced relation with the gear box and in a position such that the third of said slots passes across the axis of the said adjustable shaft in any adjusted position thereof; and means for clamping the outer end of said shaft in a predetermined adjusted position to said supporting plate.

6. In combination with a pick-off change gear mechanism having at least one driving gear and one driven gear and an intervening idler gear; an angularly adjustable change gear arm; a stud shaft for supporting said idler gear carried by said arm and adjustable radially thereof; a support for the outer end of the said stud shaft comprising a supporting plate member having a pair of spaced parallel slots formed therein, said plate also having a third slot therein spaced from said parallel slots and whose major axis extends in a direction transverse to the direction of the axes of said pair of parallel slots; and normally fixed anchor studs coacting with two of said spaced slots in the plate for supporting the plate rigidly in position with the third slot passing across the axis of the said adjustable gear supporting stud; and means cooperating with said third slot for clamping the outer end of the adjustable stud to said supporting plate.

7. In combination with a pick-off change gear mechanism having a driving gear and a driven gear and an intervening idler gear; an adjustable stud shaft for said idler gear; a change gear arm for supporting the inner end of said stud shaft; a support for the outer end of the said stud shaft, comprising a supporting plate member having a pair of parallel arranged elongated slots formed therein, said plate also having a third elongated slot formed therein whose longitudinal axis extends in a direction transverse to the direction of said two parallel slots; and normally fixed anchoring means cooperatively related with two of the said slots in the plate for supporting the plate rigidly in position with the third slot passing across the axis of the said adjustable stud shaft; and means cooperating with said third slot for clamping the outer end of said stud shaft to said slotted supporting plate.

8. A support for the outer end of an adjustable change gear stud of a change gear transmission comprising a generally triangular plate member having formed therein at least two parallel arranged elongated slots and one elongated slot arranged transversely thereto, said three slots being spaced from each other and located near the points of the triangle; means for clamping the inner end of the adjustable change gear stud in a preselected position appropriate for a given combination of change gears; normally fixed means cooperating with two of said slots in the plate for anchoring said plate to the transmission housing in a position whereby an operative portion of the third of said slots is in coincidence with the axis of the adjustable change gear stud; and stud clamping means coacting with the said third slot for clamping the outer end of the change gear stud to the plate.

9. A detachable support for the outer end of an adjustable change gear stud of a speed change transmission comprising a plate member having a pair of anchor slots and a stud slot formed therein the longitudinal axis of said stud slot being transverse the longitudinal axis of said anchor slots, said three slots being spaced from each other as the points of a triangle; anchor bolts cooperating with the said anchor slots for securing said plate rigidly to the transmission housing in a plane lying to the outer side of the plane of the change gears of the transmission and with said stud slot in a position extending across the axis of the gear stud in any adjusted position of the latter; and means coacting with said stud slot for clamping the outer end of the adjustable change gear stud to the plate.

10. In combination with a pick-off change gear transmission having a gear box and at least one driving shaft, one driven shaft, an adjustable idler gear shaft, and a movable support for the inner end of said idler gear shaft; a support for the outer end of said shaft comprising a laterally adjustable plate member having a slot formed therein whose longitudinal axis extends in a direction transverse the direction of lateral adjustability of the plate; spaced anchoring means provided by the gear box for supporting the plate normally in fixed spaced relation with the gear box and in position such that the slot in the plate extends across the axis of the said idler gear shaft in any adjusted position of the latter; and means for clamping the outer end of said shaft to said supporting plate.

11. An outer support for an adjustable idler gear shaft of a pick-off gear change speed transmission comprising a laterally shiftable supporting plate member; a pair of spaced anchor studs for mounting said plate to the transmission housing in a predetermined adjusted position outside of the plane of the change-gears thereof; said plate having an elongated slot formed therein whose longitudinal axis extends transversely to the direction of lateral shiftability of the plate; and means provided in part by said slot in the plate and in part by the adjustable idler gear shaft for clamping the outer end of the shaft to the said plate, said clamping occurring at the third point of a triangle formed by said spaced anchor studs and idler gear shaft in any adjusted position of the latter.

12. A support for the free end of an adjustable change gear stud comprising a generally triangular plate member having formed therein at least three elongated slots spaced from each other and located near the points of the triangle; two of said slots extending lengthwise of the base of the triangle and another of said slots extending parallel to a perpendicular from the base; normally fixed means cooperating with two of said slots for anchoring said plate fixedly in position with an operative portion of the third of said slots in coincidence with the axis of the adjustable change gear stud; and means including the said third slot for clamping the free end of the change gear stud to the plate.

WILLIAM F. ZIMMERMANN.